J. E. McCLAIN.
DITCH BUILDER AND CLEANER.
APPLICATION FILED AUG. 19, 1918.

1,295,996.

Patented Mar. 4, 1919.
4 SHEETS—SHEET 1.

Inventor:
Jamesie E. McClain
by
Hazard & Miller
Att'ys.

J. E. McCLAIN.
DITCH BUILDER AND CLEANER.
APPLICATION FILED AUG. 19, 1918.

1,295,996.

Patented Mar. 4, 1919.
4 SHEETS—SHEET 2.

Inventor:
Jamesie E. McClain,
by Hazard & Miller
Att'ys.

J. E. McCLAIN.
DITCH BUILDER AND CLEANER.
APPLICATION FILED AUG. 19, 1918.

1,295,996.

Patented Mar. 4, 1919.
4 SHEETS—SHEET 3.

Inventor:
Jamesie E. McClain,
by Hazard & Miller
Att'ys.

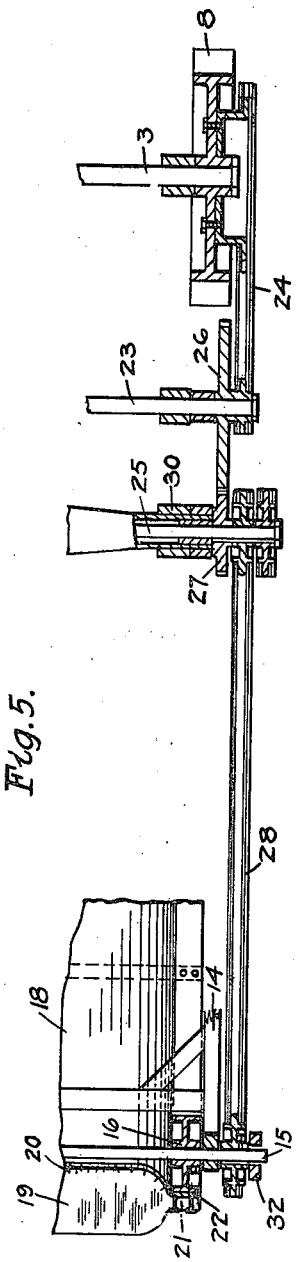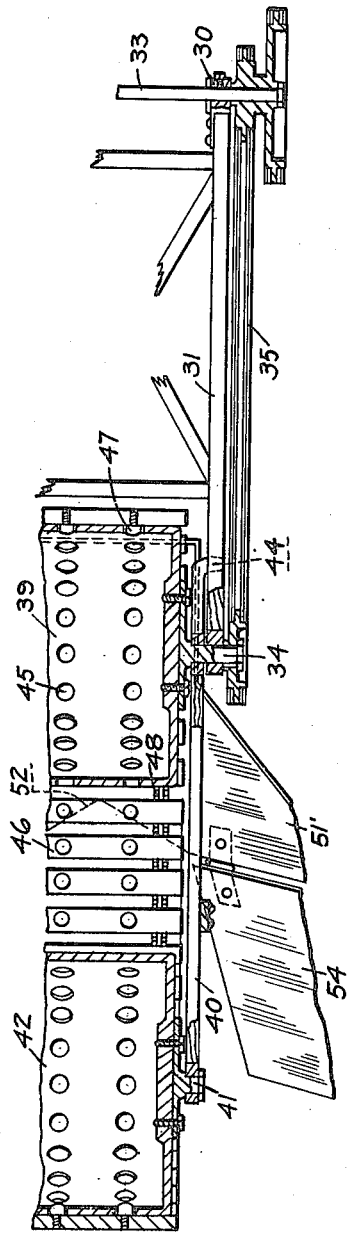

UNITED STATES PATENT OFFICE.

JAMESIE E. McCLAIN, OF TEMPE, ARIZONA.

DITCH BUILDER AND CLEANER.

1,295,996.   Specification of Letters Patent.   Patented Mar. 4, 1919.

Application filed August 19, 1918. Serial No. 250,550.

*To all whom it may concern:*

Be it known that I, JAMESIE E. MCCLAIN, a citizen of the United States, residing at Tempe, in the county of Maricopa and State of Arizona, have invented new and useful Improvements in Ditch Builders and Cleaners, of which the following is a specification.

My object is to build a ditch builder and cleaner upon the running gear of an automobile or the like, and my invention consists in the novel features herein shown, described and claimed.

Fig. 5 is a fragmentary horizontal sectional detail on the line 5—5 of Fig. 2.

Fig. 6 is a fragmentary horizontal sectional detail on the line 6—6 of Fig. 2.

Figure 1:
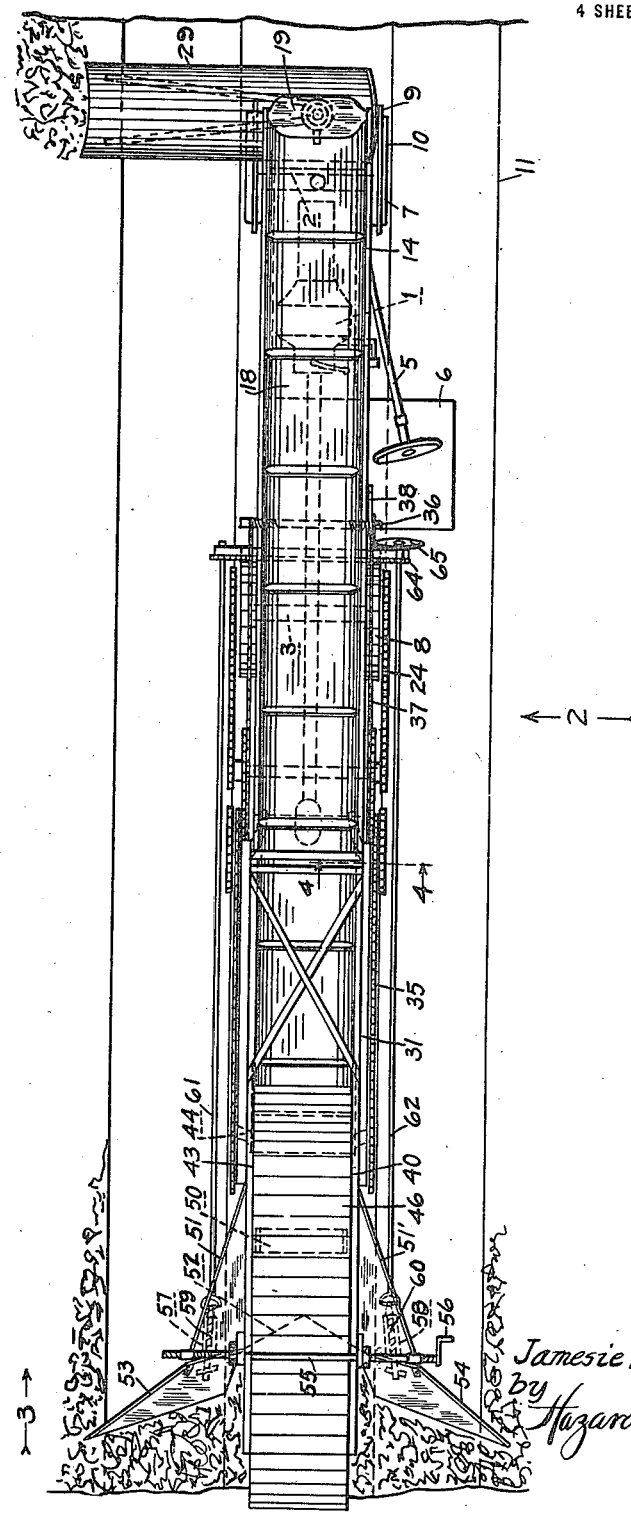
Figure 1 is a top plan view looking in the direction indicated by the arrow 1 in Fig. 2.
Figure 2:
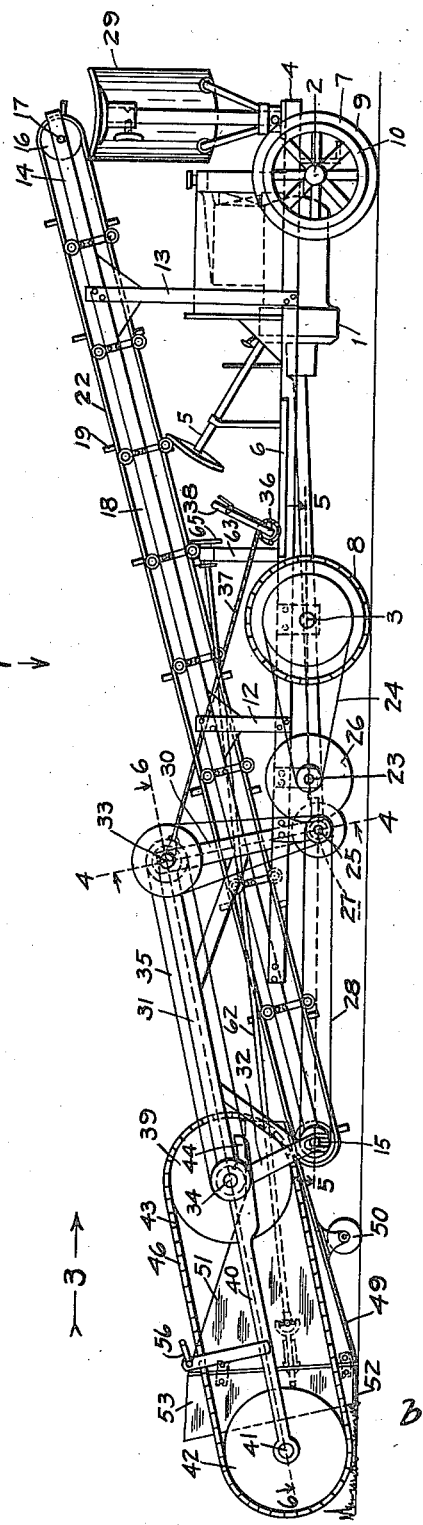
Fig. 2 is a side elevation as seen looking in the direction indicated by the arrows 2 in Figs. 1 and 3.
Figure 3:
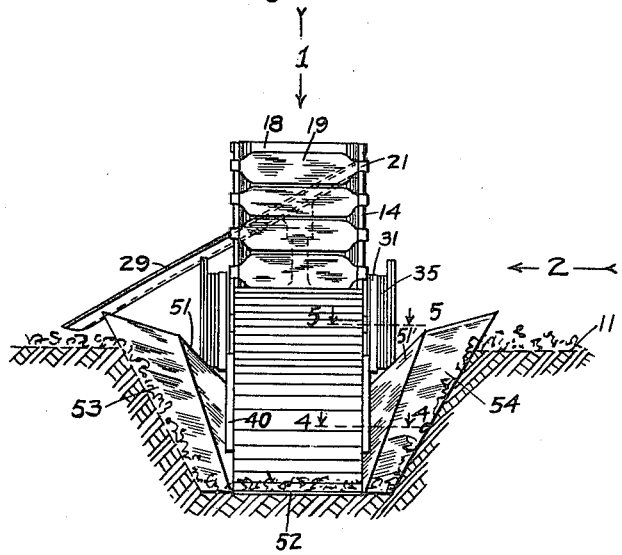
Fig. 3 is a front elevation as indicated by the arrows 3 in Figs. 1 and 2.
Figure 4:
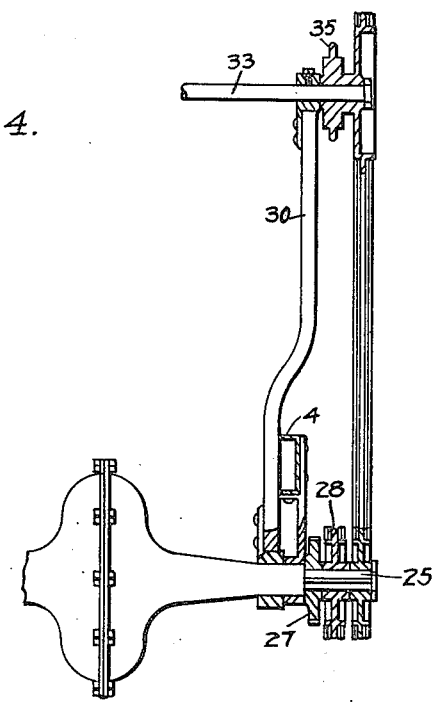
Fig. 4 is a fragmentary sectional detail on the lines 4—4 of Figs. 1 and 2.

The power plant 1 may be of any of the usual automobile constructions. The front axle 2 and the rear axle 3 are shortened and the main frame 4 is mounted upon these axles 2 and 3 and the power plant 1 is mounted upon the main frame 4. The rear axle 3 is near the longitudinal center of the frame 4 so that the frame extends a considerable distance backwardly from the axle. The steering post 5 is off-set to one side of the frame and the operator's platform 6 is mounted under the steering post wheel and extends from the side of the frame 4. The forward steering wheels 7 and the rear drive wheels 8 are small in diameter so that the frame 4 will be near the ground. The front wheels 7 have peripheral flanges 9 extending from the transverse centers of the rims 10 so that the flanges will cut into the soft ground in the bottom of the ditch 11 and hold the wheels from slipping sidewise and assist in steering the machine.

Posts 12 and 13 extend upwardly from the sides of the main frame 4, and the conveyer frame 14 is mounted upon the upper ends of these posts 12 and 13 and upon the rear end of the main frame 4, the posts 13 being substantially twice as high as the posts 12, so as to incline the conveyer frame 14 from a point a considerable distance behind and below the rear end of the main frame 4 to a considerable distance above the steering wheels 7.

In the construction and operation, it is to be understood that the power plant 1, the main frame 4, and the wheels 7 and 8 are to run backward in operating the ditch cleaning machine to run forward, and that the lower end of the frame 14 is the front end of the conveyer and at the rear end of the frame 4.

A shaft 15 is mounted in the lower end of the conveyer frame 14. Belt wheels 16 are mounted upon the shaft between the side members of the frame. A similar shaft 17 is mounted at the upper end of the conveyer frame 14 and similar belt pulleys are mounted on the shaft 17. An endless conveyer canvas 18 is mounted to run around the shafts 15 and 17. Blades 19 are placed against the outer face of the canvas and the canvas is secured to the edges of the blades by nails or the like 20. Arms 21 extend from the ends of the blades and the arms 21 are on a level with the vertical centers of the blades. The edges of the canvas are secured to the lower sides of the arms 21 so that the canvas bulges downwardly between the arms, and the side edges 22 of the canvas run upon the pulleys 16 like belts.

A countershaft 23 is mounted across the main frame 4 behind the axle 3. Chains and sprocket wheels 24 connect the countershaft to be driven from the axle 3. A second countershaft 25 is mounted behind the countershaft 23 and large gears 26 upon the countershaft 23 drive small gears 27 upon the second countershaft 25 so as to increase the speed of the second countershaft relative to the axle 3. Chains 28 connect sprocket wheels upon the second countershaft 25 to sprocket wheels upon the shaft 15 so as to drive the conveyer in the frame 14.

A spout 29 is mounted in position to receive the material from the upper end of the conveyer frame 14 and discharge it sidewise to the bank of the ditch.

Posts 30 are pivotally connected at their lower ends upon the second countershaft 25, there being one post at each side of the frame 14. Arms 31 extend from the upper ends of the posts 30 and struts 32 extend downwardly from the other ends of the arms 31, the lower ends of the struts being bifurcated to fit upon the shaft 15. A third countershaft 33 is mounted in the upper ends of the posts 30 and a drum shaft 34 is mounted in the other ends of the arms 31, the shafts 33 and 34 being connected by sprocket wheels and chains 35. A windlass 36 is mounted upon the frame 4 and cables 37 connect the windlass 36 to the upper ends of the posts 30, said windlass being operated by a hand-lever 38, so that by operating the hand-lever 38 the upper ends of the posts 30 may be swung forwardly or backwardly to raise and lower the shaft 34. The drum 39 is mounted upon the shaft 34. Arms 40 are pivotally mounted upon the shaft 34 and a shaft 41 carrying a second drum 42 is mounted in the other ends of the arms 40. An endless slatted apron 43 runs around the drums 39 and 42. The apron 43 passing downwardly in front of the drum 42 and under the drum normally rests upon the bottom of the ditch and serves as a traction belt tread to support a part of the mechanism and assist in moving the machine, and the connections between the shaft 34 and the axle 3 are geared so that the apron 43 will travel faster than the drive wheels 8. Arms 44 extend from the arms 40 and engage under the arms 31 to make jack-knife joints, so that the drum 42 may be raised or lowered by the unevenness of the bottom of the ditch and so that when the operating lever 38 is operated to pull the upper ends of the posts 30 toward the windlass 36 the drum 42 will be raised from the ground. The drums 39 and 42 have perforations 45, and the slats 46 of the apron 43 have bolt heads 47 fitting in these perforations 45 to make toothed connections between the drums and apron for driving the apron. The slats 46 are connected together by hinges 48.

A bottom 49 is mounted under the apron 43 and extends upwardly and backwardly from the bottom of the ditch to discharge on to the revolving conveyer canvas 18. Wheels 50 are mounted under the bottom 49, and the sides 51 and 51' extend upwardly and outwardly from the side edges of the bottom. The cutting edge 52 extends forwardly from the bottom to make, scrape, or clean the bottom of the ditch, and side cutters 53 and 54 extend upwardly and outwardly from the sides of the cutter 52 forwardly and outwardly from the sides 51 and 51' to make, scrape or clean the sides of the ditch. The upper forward corners of the sides 51 and 51' are connected by a rod 55 having right and left screws operating in bearings fixed to the sides, so that by manipulating the crank 56 the sides 51 and 51' may be moved to or from each other to take care of the different widths of the ditch. The side cutters 53 and 54 are hinged to the forward edges of the sides 51 and 51'. Screw-threaded sleeves 57 and 58 are connected to the cutters, screws 59 and 60 operate in the sleeves, and rods 61 and 62 are connected to the screws 59 and 60 by tumbling rod joints, said rods extending back to the frame 4, the rear ends of the rods being mounted upon posts 63. Sprockets are fixed upon the rear ends of the rods and connected by a chain 64, and a hand-wheel 65 is fixed upon one of the rods, so that by manipulating the hand-wheel 65 the cutters 53 and 54 may be swung upon their hinges to adjust the width and angle at which the cutters will trim the sides of the ditch.

As before suggested, in the operation of cleaning a ditch the machine is operated to move the power mechanism backwardly so that the steering wheels 7 are at the rear end of the machine although they are the front wheels of the automobile construction. When the machine has been properly set in the ditch 11 forward movement of the machine, that is backward movement of the truck, will cause the apron 43 to run upon the bottom of the ditch and the cutters 52, 53 and 54 to scrape the bottom and sides of the ditch to cut the vegetation and unevenness and move the cut material inwardly and backwardly to the bottom 49 and the operation of the apron passing over the bottom 49 will carry this material backwardly on to the canvas 18 and the canvas will carry the material backwardly and upwardly and discharge it through the spout 29 to the bank of the ditch. Normally the weight of the apron 43 and coöperating parts rests upon the shaft 15 through the struts 32 and at such a time the handle 38 is operated to loosen the cables 37. When desired, the operation of the handle 38 will tighten the cables 37 upon the windlass 36 and raise the apron 43 and the coöperating parts to any desired height from the bottom of the ditch.

Various changes may be made in the details of construction without departing from the spirit of my invention as claimed.

I claim:

1. A ditch builder and cleaner comprising an automobile running gear and power plant, a frame mounted upon the running gear and extending beyond the rear axle, a conveyer mounted upon the main frame and extending from beyond the main frame upwardly and forwardly to a position above the front of the main frame, vertical posts pivotally connected at their lower ends to the main frame, arms extending from the upper ends of the posts, struts extending from the other ends of the arms and adapted to be supported by the conveyer frame, a windlass mounted upon the main frame, cables connecting the windlass to the upper ends of the posts, bottom and side cutters mounted to discharge on to the conveyer, an endless apron mounted above the bottom cutter between the side cutters, and means for connecting the apron and cutters to the arms; so that by operating the windlass the cutters and apron may be raised and lowered.

2. A ditch builder and cleaner comprising an automobile running gear and power plant, a frame mounted upon the running gear and extending beyond the rear axle, a conveyer mounted upon the main frame and extending from beyond the frame upwardly and forwardly to a position above the front of the frame, vertical posts pivotally connected at their lower ends to the frame, arms extending from the upper ends of the posts, struts extending from the other ends of the arms and adapted to be supported by the conveyer frame, a windlass mounted upon the main frame, cables connecting the windlass to the upper ends of the posts, bottom and side cutters mounted to discharge on to the conveyer, an endless apron mounted above the bottom cutter between the side cutters and extending beyond the bottom cutter so as to move the material from the bottom of the ditch on to the cutter, and means for operating the apron.

3. A ditch builder and cleaner comprising an automobile running gear and power plant, a frame mounted upon the running gear and extending beyond the rear axle, a conveyer mounted upon the main frame and extending from beyond the frame upwardly and forwardly to a position above the front of the frame, vertical posts pivotally connected at their lower ends to the frame, arms extending from the upper ends of the posts, struts extending from the other ends of the arms and adapted to be supported by the conveyer frame, a windlass mounted upon the main frame, cables connecting the windlass to the upper ends of the posts, bottom and side cutters mounted to discharge on to the conveyer, an endless apron mounted above the bottom cutter between the side cutters and extending beyond the bottom cutters so as to move the material from the bottom of the ditch on to the cutter, means for operating the apron, and wheels mounted to support the cutters and apron.

In testimony whereof I have signed my name to this specification.

J. E. McCLAIN.